(12) United States Patent
Weber et al.

(10) Patent No.: US 12,702,094 B2
(45) Date of Patent: Aug. 11, 2026

(54) PLANT CONTAINER SUSPENSION DEVICE

(71) Applicants: Lana Christine Weber, Veysonnaz (CH); Kosei Paul Weber, Veysonnaz (CH)

(72) Inventors: Lana Christine Weber, Veysonnaz (CH); Kosei Paul Weber, Veysonnaz (CH)

( * ) Notice: Subject to any disclaimer, the term of this patent is extended or adjusted under 35 U.S.C. 154(b) by 208 days.

(21) Appl. No.: 18/509,442

(22) Filed: Nov. 15, 2023

(65) Prior Publication Data

US 2025/0151666 A1 May 15, 2025

(51) Int. Cl.
*A01G 9/02* (2018.01)
*A47G 7/04* (2006.01)

(52) U.S. Cl.
CPC ............. *A01G 9/024* (2013.01); *A01G 9/023* (2013.01)

(58) Field of Classification Search
CPC .......... A47G 7/04; A47G 7/044; A47G 7/045; A47G 7/047; A01G 9/024
See application file for complete search history.

(56) References Cited

U.S. PATENT DOCUMENTS 380,592 A * 4/1888 Powell .................... B42F 13/12 402/7
1,916,305 A * 7/1933 Esselen .................. A01G 9/122 40/645
5,052,148 A * 10/1991 Sharon ................... A01G 9/023 248/328
5,586,413 A * 12/1996 Sharon ................... A47G 7/041 248/318
5,727,347 A * 3/1998 Sellers ..................... A01G 9/04 47/67
5,743,044 A * 4/1998 Hopkins ................ A47G 7/047 47/67

(Continued)

FOREIGN PATENT DOCUMENTS

EP 2 988 588 B1 4/2014
FR 2 644 338 A1 9/1990

(Continued)

OTHER PUBLICATIONS

Mad Happenings, "Orchid Vanda Wire Hanger Adjustable Length 22—36 No Basket Needed", <https://www.ebay.com/itm/333955621375>, retrieved Jan. 23, 2024.

(Continued)

*Primary Examiner* — Kristen C Hayes

(57) ABSTRACT

A suspension device for a plant container is disclosed. The suspension device comprises a support engageable with the plant container, and a shaft extending from a central region of the support. The shaft can extend through the plant container. The support comprises a spiral extending outwards relative to the shaft, transverse thereto. The plant container has a base and an upper opening. The shaft extends into and through the base, and out of the plant container via the upper opening. The support engages the base to support the plant container. A path-forming tool is also disclosed. The path-forming tool can form a path through matter in a plant container. The path-forming tool comprises an elongate element having a free end region. The free end region is a beveled free end region.

19 Claims, 7 Drawing Sheets

(56) References Cited

U.S. PATENT DOCUMENTS

| | | | | | |
|---|---|---|---|---|---|
| D431,127 | S * | 9/2000 | Connor | D6/403 |
| 6,381,900 | B1 | 5/2002 | Crowley | |
| D506,160 | S * | 6/2005 | Lambert | D11/148 |
| D642,822 | S * | 8/2011 | Cute | D6/405 |
| D791,014 | S * | 7/2017 | Hoffman | D11/148 |
| 2009/0293355 | A1* | 12/2009 | Clouston | A01G 9/02 47/79 |
| 2010/0107488 | A1 | 5/2010 | King | |
| 2015/0096227 | A1* | 4/2015 | Deason | A47G 7/047 248/27.8 |
| 2020/0205588 | A1* | 7/2020 | Benoit | A01G 9/024 |
| 2020/0367670 | A1* | 11/2020 | Edwards | A47G 7/044 |

FOREIGN PATENT DOCUMENTS

| | | |
|---|---|---|
| RU | 198397 | 12/2019 |
| WO | 92/03039 | 3/1992 |

OTHER PUBLICATIONS

Orchid Den, "Long Hangers—Wire 140mm Pack of 5", <https://orchidden.com.au/product/hangers-pot-length-560mm-wire-140mm-pack-of-5/>, retrieved Jan. 23, 2024.

Orchid Den, "Long Hangers—Wire 200mm Pack of 4", <https://orchidden.com.au/product/hangers-pot-length-560mm-wire-200mm-pack-of-4/>, retrieved Jan. 23, 2024.

Waldor Orchids, "Orchid Nerd™ Galvanized Double Clay Pot Metal Hangers 18" inch", <https://www.waldor.com/products/galvanized-metal-hangers>, retrieved Jan. 23, 2024.

orchidsupply.com, "Double Wire Plastic Pot Hanger", <https://orchidsupply.com/shop/growing-supplies/double-wire-plastic-pot-hanger/>, retrieved Jan. 23, 2024.

Kelley's Korner Orchid Supplies, "Hanger, Wall", <https://www.kkorchid.com/hangers-and-supports/Hanger-Wall.html>, retrieved Jan. 23, 2024.

Atroy, "Atroy 6Pcs Spiral Plant Support, 15.7 inch Plant Supports Spiral Flower Cages, Garden Plant Stakes for Orchid Lily Rose Tomatoes, Dark Green", <https://www.amazon.co.uk/Atroy-Spiral-Support-Supports-Tomatoes/dp/B09M89HVHD>, retrieved Jan. 23, 2024.

Ebay, "Hanger Save Space Bromeliad Orchid Foliage Flower Plant Pot Holder Vertical Grow for sale online", <https://www.pinterest.com.mx/pin/347129083748137913/>, retrieved Jan. 23, 2024.

Fruugo, "6 Pcs Black Iron Air Plant Stand Holder—3 Sizes Spiral Flower Display", <https://www.fruugoschweiz.com/6-stuck-black-iron-air-plant-stand-holder-3-gro%C3%9Fen-spiral-flower-display/p-201061841-427733312?language=de&ac=ProductCasterAPI&asc=pmax&gad_source=1&gclid=CjwKCAiA5L2tBhBTEiwAdSxJXy4FwzHOLAPD6lsq2DWNTCZTfqIPH6EUgS-Q-_NtQVFUHYdzvAp3NBoC3TgQAvD_BwE>, retrieved Jan. 23, 2024.

savacoolandsons.com, "Wrought Iron Spiral Plant Stand—22' Wide x 38½' Tall", <https://in.pinterest.com/pin/37105445677809-6733/>, retrieved Jan. 24, 2024.

Jumia, "8PCS Air Plant Holder Spiral Planter for Tabletop Home", <https://www.jumia.com.eg/generic-8pcs-air-plant-holder-spiral-planter-for-tabletop-home-33595759.html>, retrieved Jan. 24, 2024.

Albremen.PH, "hkanda Iron Plant Support Plant Support Stand Sturdy Spiral Plant Trellis Support Ideal for Southeast Asian Gardens Versatile Metal Rack for Vines", <https://shopee.ph/hkanda-Iron-Plant-Support-Plant-Support-Stand-Sturdy-Spiral-Plant-Trellis-Support-Ideal-for-Southeast-Asian-Gardens-Versatile-Metal-Rack-for-Vines-Flowers-Indoor-outdoor-Use-i. 164756757.18184489860?sp_atk=b6de69c9-dc76-4ac8-b7aa-385d5dce7709&xptdk=b6de69c9-dc76-4ac8-b7aa-385d5dce7709&is_from_signup=true>, retrieved Jan. 24, 2024.

Pamono By Chairish, "Mid-Century French Iron Spiral Sculpture, 1960", <https://www.pamono.eu/mid-century-french-iron-spiral-sculpture-1960>, retrieved Jan. 24, 2024.

Ezspace, "Plant Stand 3 Tier Metal Indoor Outdoor Multiple Stand Holder Shelf Rack Planter Display for Patio Garden Living Room Corner Balcony and Bedroom (3-Tier-1, Grey)", <https://www.lazada.com.ph/products/ezspace-plant-stand-3-tier-metal-indoor-outdoor-multiple-stand-holder-shelf-rack-planter-display-for-patio-garden-living-room-corner-balcony-and-bedroom-3-tier-1-grey-i2856720584.html>, retrieved Jan. 24, 2024.

Kroger, "White Plant Stand 3-Tier Indoor or Outdoor Folding Spiral Stair Wrought Iron Home and Garden", <https://www.kroger.com/p/white-plant-stand-3-tier-indoor-or-outdoor-folding-spiral-stair-wrought-iron-home-and-garden/0019266498096>, retrieved Jan. 24, 2024.

Snughomedecor, "Simple Macrame Plant Holder | Small Macrame Plant Hanger | Boho Decor | Cotton Plant Pot Holder | Outdoor Plant Hanger |Hanging Plant Holder", <https://www.etsy.com/listing/829949390/simple-macrame-plant-holder-small>, retrieved Jan. 24, 2024.

Is Art Home, "1 Stück, Kreativer Eisenring-Blumenkranz, Blumentopf-Wandbehang, Holz", <https://www.temu.com/ul/kuiper/un9.html?subj=goods-un&_bg_fs=1&_p_jump_id=894&_x_vst_scene=adg&goods_id=601099520021103&sku_id=17592231219882&adg_ctx=a-91eae7e2~c-017ac62c~f-11fd22a6&_x_ads_sub_channel=shopping&_p_rfs=1&_x_ns_prz_type =- 1&_x_ns_sku_id=17592231219882&mrk_rec=1&_x_ads_channel=google&_x_gmc_account=763744032&_x_login_type=Google&_x.

* cited by examiner

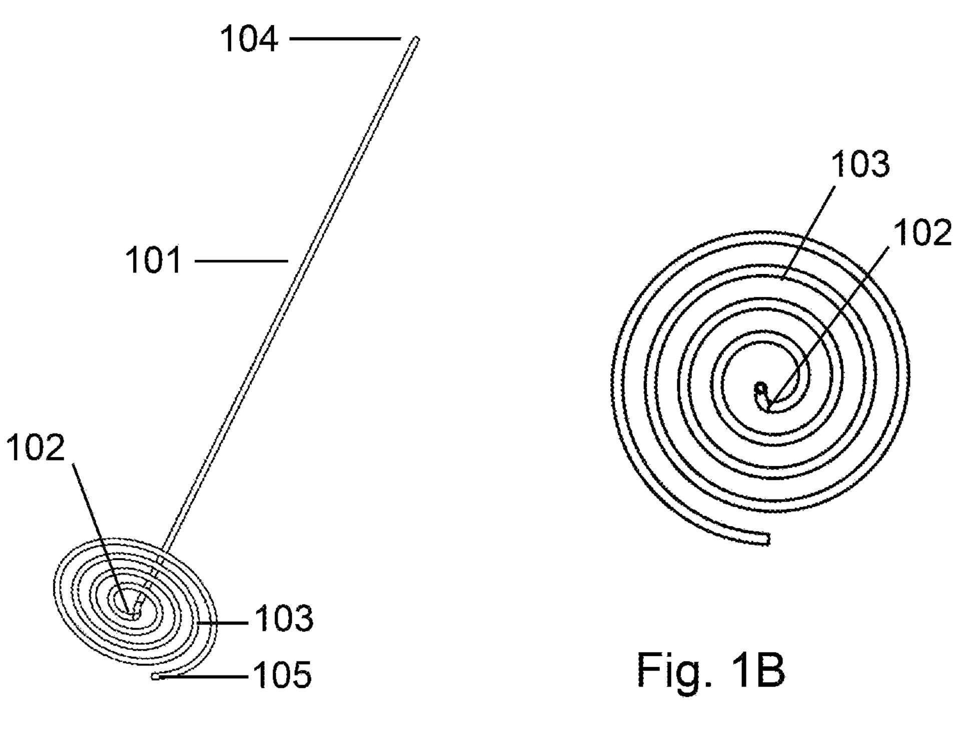
Fig. 1A
Fig. 1B
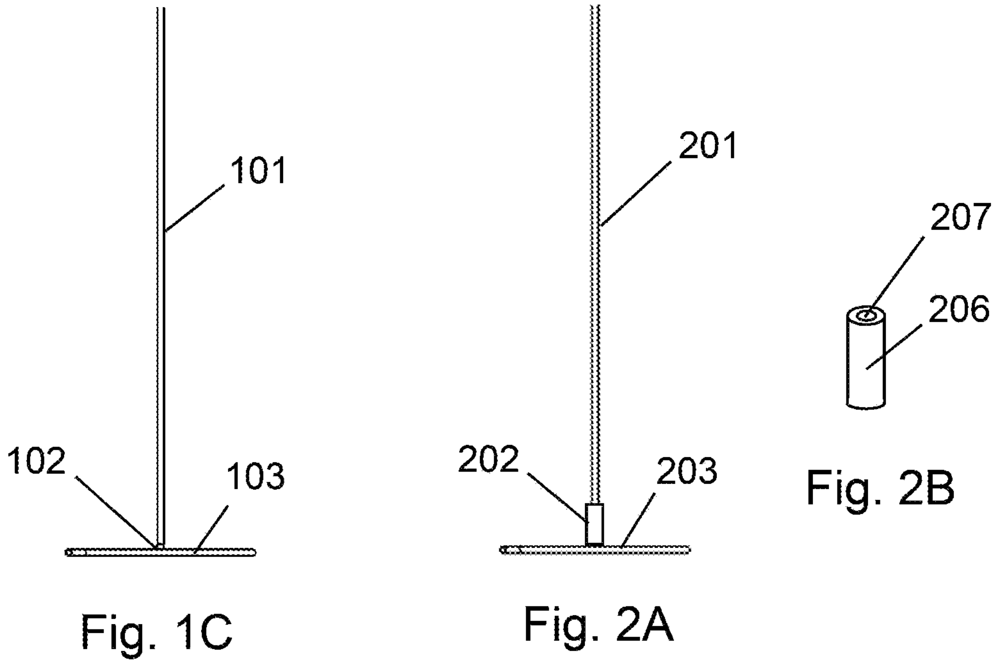
Fig. 1C
Fig. 2A
Fig. 2B

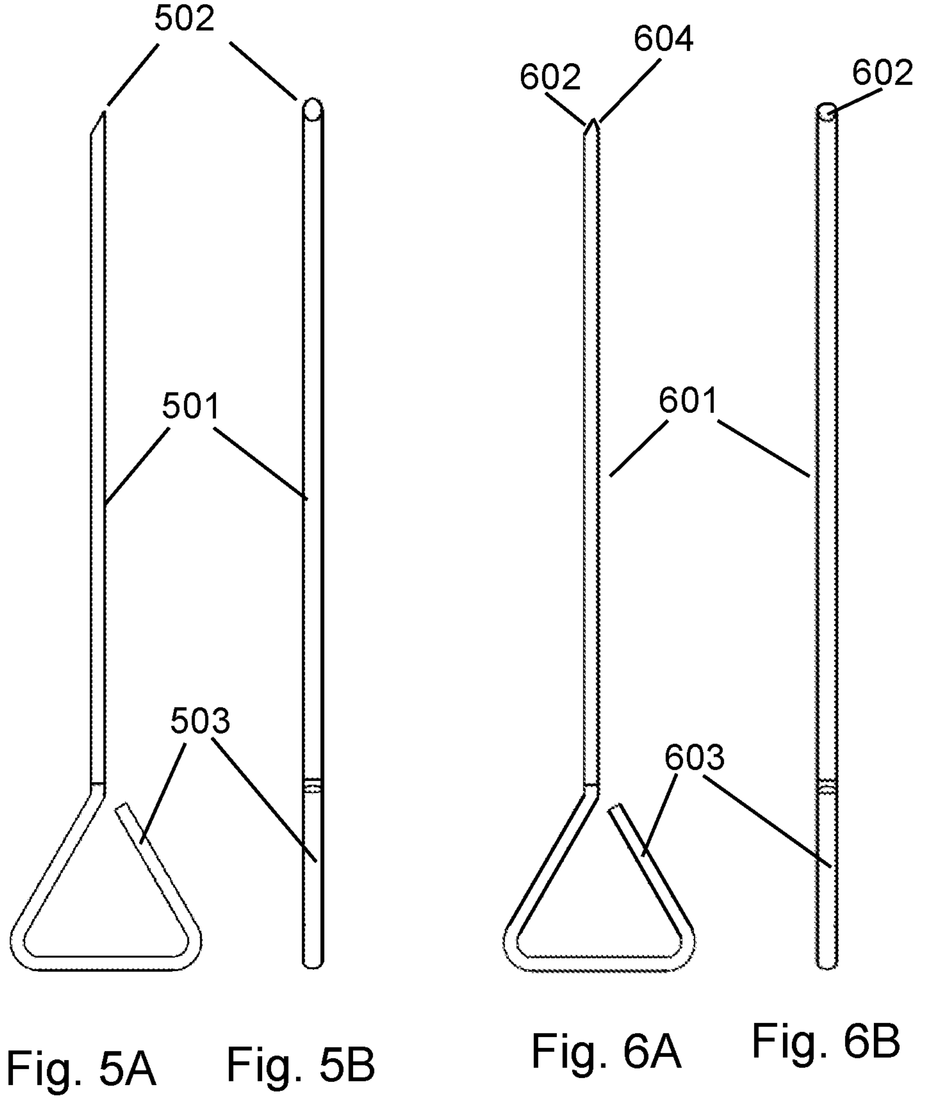
Fig. 5A Fig. 5B Fig. 6A Fig. 6B
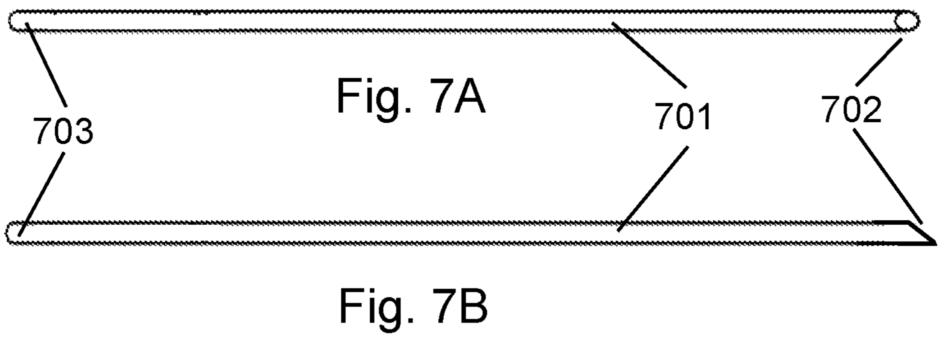
Fig. 7A
Fig. 7B

PLANT CONTAINER SUSPENSION DEVICE

This invention relates to methods and assemblies for plant container suspension devices, along with related methods and systems.

Plants, especially orchids, may be grown in a variety of planters including pots and baskets. There are various ways to store or secure potted plants including hanging, standing or directly resting on a support such as a table. For example, epiphytic orchids are commonly grown in plastic or clay pots. Methods to hang such plants may include metal bent hangers wherein a galvanized 4 mm diameter steel wire is left long and bent into a hanger exceeding the leaf height of the plant for adequate spacing; the opposite end is bent in the shape of a triangle with a central terminal rod portion bent to apply pressure at the junction of the mouth and neck of the pot. Disadvantages of this traditional system include asymmetric forces on clay pots which weaken the metal bends over time and breakage of plastic pots via aging and asymmetric forces. For larger/heavier pots a double triangulate bent metal hanger may be placed on opposite sides of the pot to reduce asymmetric forces, however these are relatively non-aesthetic and occupy significant space and cost more. The triangulate bent hanger system increases wear and tear on most basket weaves and thus baskets are more commonly found in fabric slings. Another popular suspension devices may include external metal or substantially rigid rings around a tapering pot or pot neck-mouth junction. Depending on the location and asymmetry of the planter to be suspended a further support mechanism to support the external ring may be present with asymmetric forces at times yielding an undesirable 'tilted' presentation to a subject potted plant.

According to one aspect of this invention, there is provided a suspension device for a plant container, the suspension device comprising a support engageable with the plant container, and a shaft extending from a central region of the support, the shaft being arranged to extend through the plant container.

According to another aspect of this invention, there is provided a plant container arrangement comprising a suspension device as described above, and a plant container having an upper opening, the shaft extending into and through the plant container, and the shaft extending out of the plant container via the upper opening, wherein the support engages the plant container to support the plant container.

According to another aspect of this invention, there is provided a method of supporting a plant container, wherein the method comprises providing a plant container having an upper opening, providing a suspension device as described above, inserting the shaft through the container, and arranging the support in engagement with the container to support the container.

The plant container may contain matter, which may be, for example, a growing medium, such as soil and/or compost. The matter in the plant container may further include stones, clay, bark, and/or other vegetable matter. The suspension device may comprise a plant container suspension device. The suspension device may be arranged for use with a plant container having a base and a mouth. The mouth may be an upper opening of the container. The mouth of the container may be surrounded by a top lip.

The shaft may be inserted into the plant container. The shaft may be inserted through the base of the plant container. The shaft may extend through the plant container. The shaft may extend out of the plant container via the mouth of the plant container. The shaft may be substantially straight.

The plant container may include a base. The support may engage the base to support the plant container. The support may engage the outside of the base.

The method may comprise inserting the shaft through the container. The method may involve the insertion of the shaft through the base of the container. The container may define a hole through which the shaft can be inserted. The hole may be defined in the base of the container.

After being so inserted, the method may comprise manipulating the device to engage the support with the container. The manipulation of the device may engage the support with the base of the container. The method may comprise arranging the shaft to extend through the mouth of the container.

The support may be deformable relative to the shaft to allow the support to be positioned alongside the shaft. The deformation of the support may be a bending of the support. Bending of the support may also allow for variations container presentation angles. Alternatively, the shaft and the support may be separable from each other. The support may be separated from the shaft and positioned alongside the shaft. The ability to position the support alongside the shaft provides the advantage in the embodiments described herein that it reduces the space required for packaging, transport, storage or sale of the suspension device.

The method may comprise forming the hole in the container, for example in the base of the container. The method may comprise inserting a tool into the container to form the hole. The tool may be inserted through the base of the container, thereby forming the hole in the base. The tool may comprise an electric drill bit and/or heated cross-end screwdriver. The tool may be so inserted using a twisting movement to melt the plastic to form the hole.

The shaft may have a distal free end region and a proximal end region. The free end region of the shaft may be arranged into a deformed or bent configuration to form a hook for hanging the device. The method may comprise deforming the distal end region to form the hook. The distal end region may be deformed by 180° to form the hook.

The support may extend transverse to the shaft. The support may extend outwards relative to the shaft. The support may extend around the shaft or around a region axially spaced from the proximal end of the shaft. The support may have a main axis extending longitudinally through the shaft. The support may extend around said main axis. The support is desirably provided at the proximal end region of the shaft.

The support may be a spiral support. The spiral support may comprise a plurality of turns of the spiral, such as three to five turns. In one embodiment, the spiral support may have four turns.

The shaft may comprise a first elongate part of the device. The support may comprise a second elongate part of the device.

In one embodiment, the support and the shaft may be integral with each other. The suspension device may comprise an elongate member. The elongate member may form the shaft and the support. The elongate member may comprise the first elongate part and the second elongate part.

The device may comprise a connection that connects the support to the shaft. In one embodiment, the connection may be a region of the elongate member. The connection may be a deformed portion of the elongate member between the shaft and the support.

In another embodiment, the support may be separable from the shaft. In this embodiment, the connection may connect the separate support and shaft to each other. The connection may comprise screw threads, mates, snaps, hooks, or the like.

The first and second elongate parts may be connected to each other by the connection. The connection may be an integral connection, whereby the first and second elongate parts form the elongate member. Alternatively, the first and second elongate parts may be separable from each other at the connection.

The suspension device may be formed of a material that is malleable and/or ductile. The elongate member may comprise a wire, rod, or the like. The support may be formed by deforming a region of the suspension device. The shaft may be formed by deforming a region of the suspension device. In one embodiment, the elongate member may be formed of a material that is malleable and/or ductile. The support and the shaft may be formed by deforming said elongate member. The connection may be formed by deforming said elongate member in the region between the support and the shaft.

In some embodiments, the suspension device may comprise a wire shaft attached to a spiral end. Some embodiments may incorporate a beveled path-forming tool with a single or multiple bevels or facets at the free end region.

The suspension device may be substantially symmetrical. The support may extend substantially symmetrically around the shaft. The support may disperse the hanging/support forces applied from the plant container onto the suspension device.

According to another aspect of the invention, there is provided a plant holder suspension assembly comprising first and second of the suspension devices as described above, wherein the first suspension device is attached to the second suspension device.

The first suspension device of the plant holder suspension assembly may be suspended from the second suspension device. The shaft of the first suspension device may be attached to the support of the second suspension device. Where the support comprises a spiral, the shaft of the first suspension device may engage one of the inner turns of the support of the second suspension device.

The distal end region of the shaft of the first suspension device may be deformed to form a hook. The hook so formed may be received by the support of the second suspension device whereby the hook formation may hook onto the support of the second suspension device.

According to another aspect of this invention, there is provided a suspension arrangement comprising a suspension device as described above, and a path-forming tool for forming a path through matter in a plant container.

The path-forming tool may comprise an elongate element. The elongate element may have free end region and an opposite end region. The free end region may terminate in a free end. The opposite end region may terminate in an opposite end. The elongate element may comprise a rod or a tube. The free end region of the elongate element may be a beveled free end region.

In one embodiment, the path-forming tool may have handle at the opposite end of the elongate element. The handle may be formed by deforming the elongate element into a desired shape. Alternatively, the handle may be separable from the elongate element and attachable thereto. In another embodiment, the aforesaid opposite end may be configured to be received by a hand tool, such as an electric drill. The path-forming tool may be insertable into the plant container, for example via the hole in the base. The path-forming tool may be urgeable through matter in the plant container to form the path.

The method may comprise inserting the path-forming tool into the plant container via the hole and thereafter pushing the path-forming tool through matter in the plant container to form a path. The method may further include urging the shaft along the path when the shaft is inserted into the plant container.

The insertion of the path-forming tool into the plant container may comprise rotating or twisting the path-forming tool as the path-forming tool is moved through the matter in the plant container. The movement of the path-forming tool through the matter in the plant container may comprise manipulating the path-forming tool to avoid the plant in the plant container.

It is possible that it has not been previously practical to install an internal, centrally-based hanging system directly though and within a planter or planted pot for various reasons including that: a hole may need to be drilled in the base of a plastic pot (clay pots usually have an open hole in the center of the base) to accommodate the straight (shaft) portion of the support; forcing the shaft though the growing medium of the pot, roots, rhizomes, bulbs, or any other portion of the plant may cause the straight portion (usually metal) to become stuck on or damage the plant; or not penetrate or suddenly release quickly causing personal injury. Also, any other material blocking the path such as a mesh or screen will need to be cut, perhaps making a plus-sign, or moved to allow passage of the shaft (solid wire or hollow tube) connected to the base support.

Hence it may be desirable to have a system of symmetric and dispersed hanging/support forces applied by devices that are: easy to handle, not damaging to the basket/pot, low profile, relatively simple, able to rest on a flat surface without tipping (when not hanging), relatively low cost, and aesthetically pleasing. If the shaft gets caught or will not pass through the potting media and/or plant, having a beveled probe obviates or mitigates the problems as it is successful in clearing a proper shaft path nearly 100% of the time.

Once the shaft has passed upwards through the pot base, cleared the media and plant parts, exited the lips of the pot or basket and is pushed to its fullest extent then the wire at the tip of the shaft may be bent 180 degrees to act as a hook for hanging.

Such hanging potting systems may also be linked to one another in a daisy chain fashion thus saving on space and watering.

The spiral support system may be aesthetically pleasing and minimalistic in that the shaft portion within the pot is unseen, the base spiral is unseen from all views except those from below, and a wide variety of weaker wires may be used including green coated.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 1A is a bottom perspective view of a plant container suspension device with shaft and spiral.

FIG. 1B is a top plan view of a plant container suspension device with a support having a plurality of turns.

FIG. 1C is a side view of a plant container suspension device.

FIG. 2A is a side view of a plant container suspension device with connector linking a support member and a shaft to each other.

FIG. 2B is top perspective view of a connector.

FIG. 5A is a top plan view of a manual beveled path-forming tool with beveled free end and an opposite end that may have a bent portion forming a handle.

FIG. 5B is a top plan view of the manual beveled path-forming tool of FIG. 5A rotated 90 degrees.

FIG. 6A is a top plan view of a manual beveled path-forming tool with 2 bevels on the free end.

FIG. 6B is a top plan view of the manual beveled path-forming tool of FIG. 6A rotated 90 degrees.

FIG. 7A is a top plan view of a beveled path-forming tool with beveled free end and an opposite end that may fit a drill.

FIG. 7B is a top plan view of the beveled path-forming tool of FIG. 7A rotated 90 degrees.

FIG. 8 is a side view of a daisy chain system with 3 plant container suspension devices.

DETAILED DESCRIPTION

Figures 3A, 3B, 3C:
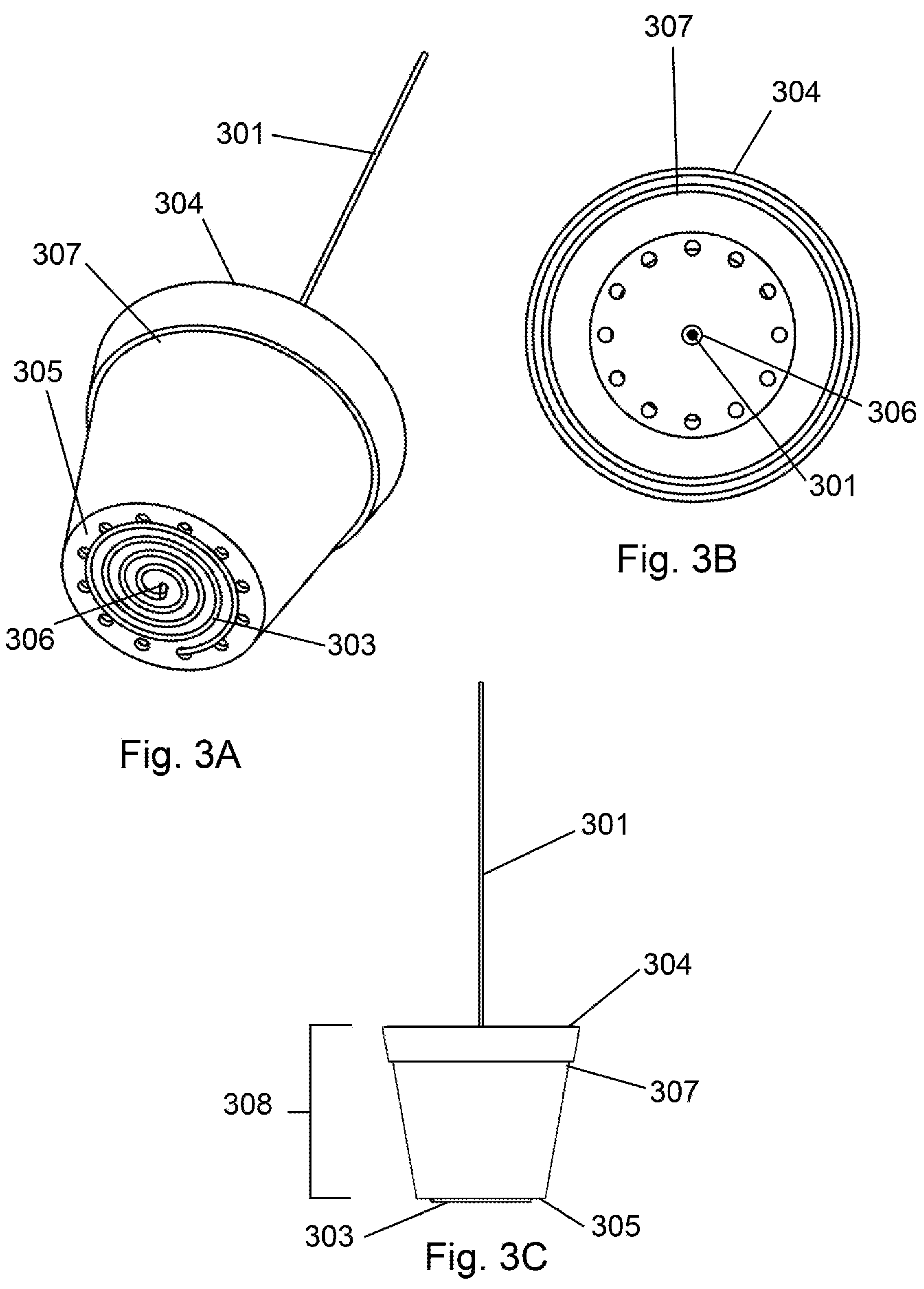
FIG. 3A is a bottom perspective view of a plant container suspension device with shaft passing through a pot and spiral adjacent to and supporting the pot base.
FIG. 3B is a bottom plan view of a plant container suspension device of FIG. 2A with shaft passing through a pot and spiral adjacent the pot base.
FIG. 3C is a side view of a plant container suspension device of FIG. 2B with shaft passing through a pot and spiral.

Further details regarding various embodiments will now be provided with reference to the drawings.

FIGS. 1A, 1B, and 1C depict an embodiment in different views. FIG. 1A is a bottom perspective view of a plant container suspension device comprising shaft 101 having a distal end region 104, connection 102, spiral support 103 and spiral support free end 105. The connection 102 connects the proximal end region of the shaft 101 to the spiral support. After being passed through the pot or basket-planter, distal end region 104 may be bent by the customer at an angle of substantially 180 degrees to act as a hook or hanger top as in FIG. 8. In some embodiments connection 102 is simply a deformation or bend in a continuous wire. In other embodiments, connection 102 may divide the plant container suspension device into 2 or more discontinuous parts that may be fixedly or releasably attached by a variety of means including but not limited to screw threads and mates, snaps, hooks, and the like. The shaft 101 is an elongate part of the suspension device. In some embodiments shaft 101 may comprise a wire and/or extrusion further comprising of metal and/or plastic. In other embodiments shaft 101 may comprise wood, ceramic, glass or rigidified natural fiber.

FIG. 1B is a top plan view of a spiral support 103 having 4 turns and spiral support distal free end 105. The spiral support 103 is an elongate part of the suspension device. In some embodiments, the spiral support 103 is in the form of a wire and/or extrusion further comprising metal and/or plastic. In other embodiments, the spiral support 103 may comprise wood, ceramic, glass or rigidified natural fiber. The suspension device may be formed of a material that is malleable and/or ductile. The elongate member may comprise a wire, rod, or the like. The support and the shaft may be integral with each other. The support may be formed by deforming a region of the suspension device. The shaft may also be formed by deforming a region of the suspension device. In one embodiment, the elongate member may be formed of a material that is malleable and/or ductile. The support and the shaft may be formed by deforming said elongate member. The suspension device may comprise an elongate member. The elongate member may form the shaft and the support. The elongate member may comprise the first elongate part and the second elongate part. The connection may be formed by deforming said elongate member in the region between the support and the shaft. The suspension device may be substantially symmetrical. In some embodiments, the suspension device may comprise a wire shaft attached to a spiral end. The connection may be a deformed portion of the elongate member between the shaft and the support. The support may extend substantially symmetrically around the shaft. The support may disperse the hanging/support forces applied from the plant container onto the suspension device. In some other embodiments, the first and second elongate parts may be connected to each other by the connection. The connection may be an integral connection, whereby the first and second elongate parts form the elongate member.

FIG. 1C is a side view of a plant container suspension device comprising shaft 101, connection 102 and spiral support 103.

FIG. 2A is a side view of a plant container suspension device comprising shaft 201, connection 202 and spiral support 203. In this embodiment, the connection may connect the separate support and shaft to each other. The support may be separable from the shaft at the connection. The connection may comprise screw threads, mates, snaps, hooks, or the like. In some other embodiments, the first and second elongate parts may be connected to each other by the connection. Alternatively, the first and second elongate parts may be separable from each other at the connection. The device may comprise a connection that connects the support to the shaft. In one embodiment, the connection may be a region of the elongate member. In further embodiments, the connection may be a fixedly connected to a region of the shaft. In some other embodiments, the connection may be a fixedly connected to a region of the support.

FIG. 2B is top perspective view of a connection 206 wherein an inner portion 207 is threaded to receive/attach-to screw threads on a portion of both shaft 201 and support 203. In other contemplated embodiments, the connection may be fixedly or releasably attached by a variety of means including but not limited to screw threads and mates, snaps, hooks, and the like.

FIGS. 3A, 3B, and 3C depict an embodiment in different views. FIG. 3A is a bottom perspective view of a plant container suspension device with spiral support 303 adjacent pot base 305, in engagement with the outside of the pot base 305. Shaft 301 traverses a central through aperture 306 in pot base 305. Shaft 301 is also passed through and out of the top lip 304 of the mouth of the pot which lies above the pot neck 307. In some embodiments, shaft 301 passes through the substantial centers of the pot/planter base 305 and pot/planter mouth/lips, in other embodiments shaft 301 does not pass through the substantial centers. In the latter embodiments, the aperture 306 may be spaced from the center of the pot base 305. Through aperture 306 is usually present at purchase on terra cotta pots but may not be present on plastic pots. An area of excess plastic may remain as a remnant of extrusion manufacture of plastic pots. The excess extrusion plastic or central plastic in a plastic pot or planter may be converted into a central through aperture by electric drill bit and/or heated (+) shaped screwdriver twisted to melt the plastic into a hole.

FIG. 3B is a top plan view of a plant container suspension device of FIG. 3A showing shaft 301 passing the through aperture 306 in a pot with lip 304 of the mouth of the pot which lies above the pot neck 307.

FIG. 3C is a side view of a plant container suspension device of FIG. 3B with spiral support 303, pot 308, pot base 305, shaft 301, pot lip 304 and pot neck 307.

Figures 4A, 4B, 4C:
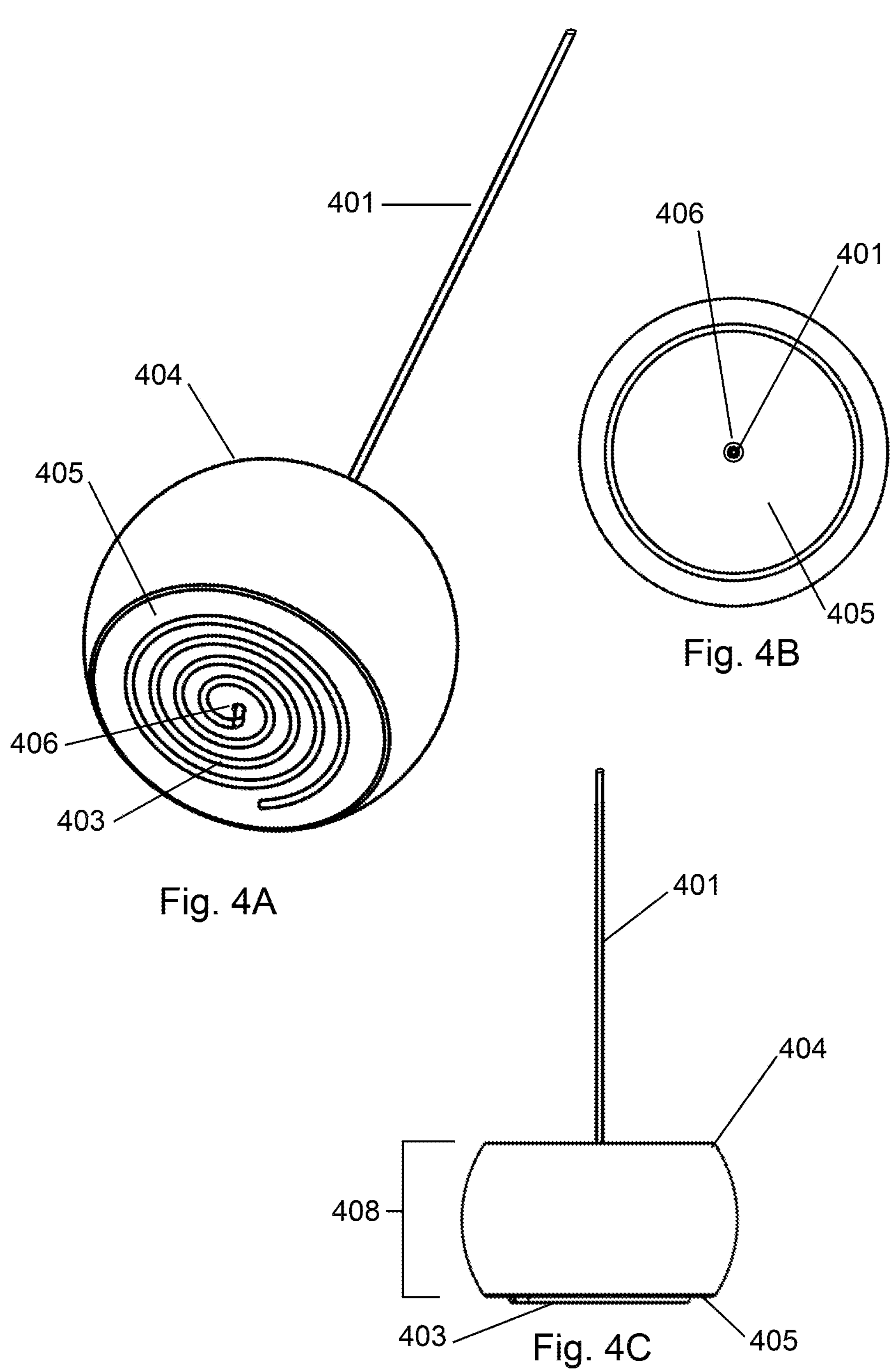
FIG. 4A is a bottom perspective view of a plant container suspension device with shaft passing through a basket-planter and spiral adjacent to and supporting the basket-planter base.
FIG. 4B is a bottom plan view of a plant container suspension device of FIG. 3A with shaft passing through a basket-planter and spiral adjacent the basket-planter base.
FIG. 4C is a side view of a plant container suspension device of FIG. 3B with shaft passing through a basket-planter and spiral.

FIGS. 4A, 4B, and 4C depict an embodiment in different views. FIG. 4A is a bottom perspective view of a plant container suspension device, with spiral support 403 adjacent basket-planter base 405, in engagement with the outside of the basket-planter base 405. Shaft 401 traverses a central through aperture 406 in basket-planter base 405. Shaft 401 is also passed through and out of the top lip 404 of the basket-planter 408. In some embodiments, shaft 401 passes through the substantial centers of the basket-planter base 405 and basket-planter lip 404, in other embodiments shaft 401 does not pass through the substantial centers. In the latter embodiments, the aperture 406 may be spaced from the center of the basket-planter base 405. Through aperture 406 is usually present at purchase on basket-planter as the material winds down to a center. If a through aperture 406 hole is too small or does not previously exist in basket-planter base 405 it may be created with a sharp probe such as an icepick or even with a beveled tool (to be discussed).

FIG. 4B is a bottom plan view of a plant container suspension device of FIG. 4A showing spiral support 403 and through aperture 406 in basket-planter base 405.

FIG. 4C is a side view of a plant container suspension device of FIG. 4B with basket-planter 408, shaft 401, a, basket-planter base 405 and basket-planter lip 404.

FIGS. 5A, and 5B depict an embodiment in different views. FIG. 5A is a top plan view (as if the shaft was resting on a surface) of a manual beveled path-forming tool comprising a straight shaft portion 501 with beveled free end 502 and an opposite end portion bent forming a handle 503. The path-forming tool may comprise an elongate element. The elongate element may have free end region and an opposite end region. The free end region may terminate in a free end. The opposite end region may terminate in an opposite end. In some embodiments, the path-forming tool 501 comprises a solid rod of soft aluminum of 6 mm diameter that is polished and/or sanded and/or rounded to remove/soften any sharp edges that may damage living matter and/or planter material. In other contemplated embodiments, path-forming tools may comprise a range of metals, plastics, woods, ceramics, hard materials and the like. In further embodiments the path-forming tool may be a hollow tube that is beveled. In some embodiments, a handle as a separate part may be affixed to the rod. The hand operated path-forming tool need not be rotated in the same direction continually. It may be suitable to rotate 1-2 hours of the clock (30° to 60°) clockwise and then counterclockwise as the device is advanced to its target between plant or potting media materials.

FIG. 5B is a top plan view of the manual beveled path-forming tool of FIG. 5A rotated 90 degrees to show a different view of beveled free end 502 architecture.

FIGS. 6A, and 6B depict an embodiment in different views. FIG. 6A is a top plan view of a manual beveled path-forming tool comprising straight shaft portion 601, two bevels (602 and 604) on the free end and an opposite end bent forming a handle 603. In some embodiments, free end region may have more than 2 bevels and/or be faceted which may reduce trauma to living plant material that is adjacent or affected by the boring action.

FIG. 6B is a top plan view of the manual beveled path-forming tool of FIG. 6A rotated 90 degrees but principally displays only one side of the bevel 602.

FIGS. 7A, and 7B depict an embodiment in different views. FIG. 7A is a top plan view (as if the shaft was resting on a surface) of a beveled path-forming tool 701 with a beveled free end region 702 and an opposite end region 703 that may fit a drill. In some embodiments, free end region may have a single beveled. In some embodiments the path-forming tool 701 comprises a solid rod of soft aluminum of 6 mm diameter that is polished and/or sanded and/or rounded to remove/soften any sharp edges that may damage living matter and/or planter material. In other contemplated embodiments, path-forming tools may comprise a range of metals, plastics, woods, ceramics, hard materials and the like. In further embodiments, the path-forming tool 701 may be a hollow tube that is beveled. In some embodiments, the path-forming tool is attached to an electric drill, at opposite end region 703, advanced slowly and rotated at slow speeds to create a desirable path for the shaft opposite end region 703 through matter in the pot 308 or basket-planter 408. Such matter may be, for example, bark, fiber, fired-clay, soil, compost, stones, and/or vegetable matter.

FIG. 7B is a top plan view of the beveled path-forming tool of FIG. 7A rotated 90 degrees.

Figure 8:
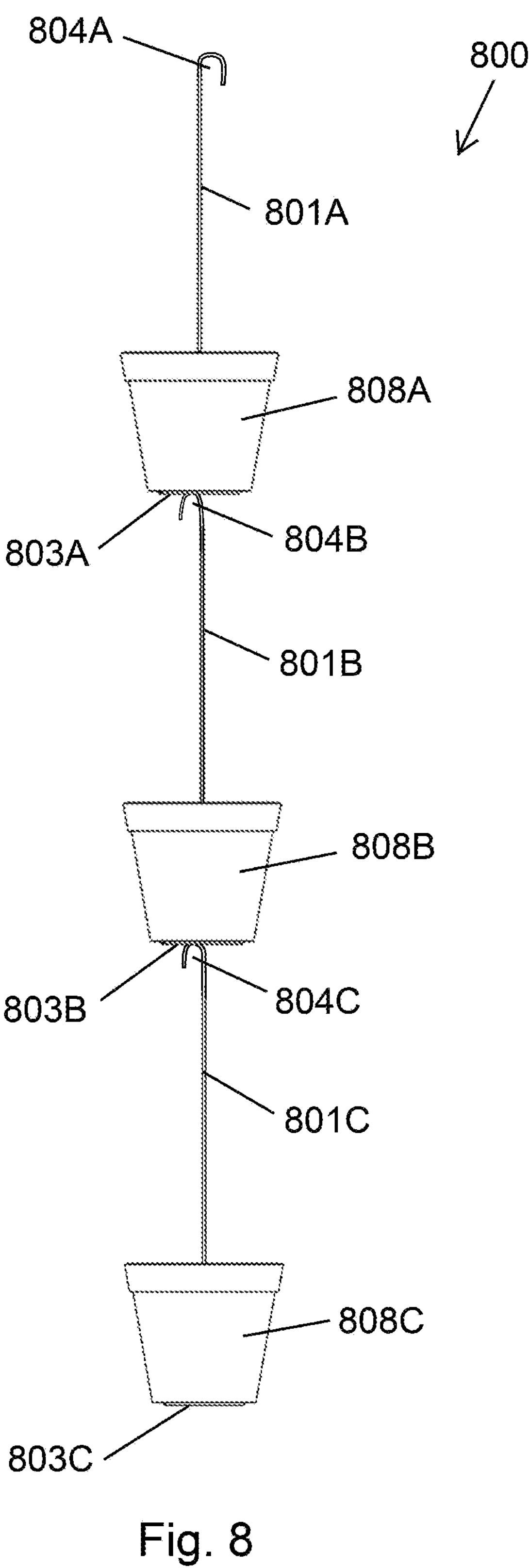
FIG. 8 is a side view of 3 plant container suspension device in 3 pots linked together as a 'daisy chain'

FIG. 8 is a side view of a daisy chain system 800 of a plurality, in this case 3, plant container suspension devices for 3 pots 808A, 808B and 808C, comprising shafts 801A, 801B and 801C; the system is linked together by bent distal end regions 804B and 804C and hooking into (or an object such as a band attached to) a relatively central spiral aspect (bend or first turn or two) of spiral support 803A or 803B. In the embodiment shown, spiral support 803C is free and available for the daisy chain to continue. The uppermost bent distal portions of shafts 804A will support all weight of the attached daisy chain below and in some embodiments be a 4 mm diameter coated metal wire. In another aspect of the invention, there is provided a plant holder suspension assembly comprising first, second and/or more suspension devices as described above, wherein the first suspension device is attached to the second suspension device, and so forth.

The first suspension device of the plant holder suspension assembly may be suspended from the second suspension device. The shaft of the first suspension device may be attached to the support of the second suspension device, and so forth. Where the support comprises a spiral, the shaft of the first suspension device may engage one of the inner turns of the support of the second suspension device.

The distal end region of the shaft of the first suspension device may be deformed to form a hook. The hook so formed may be received by the support of the second suspension device whereby the hook formation may hook onto the support of the second suspension device.

Figures 9A, 9B:
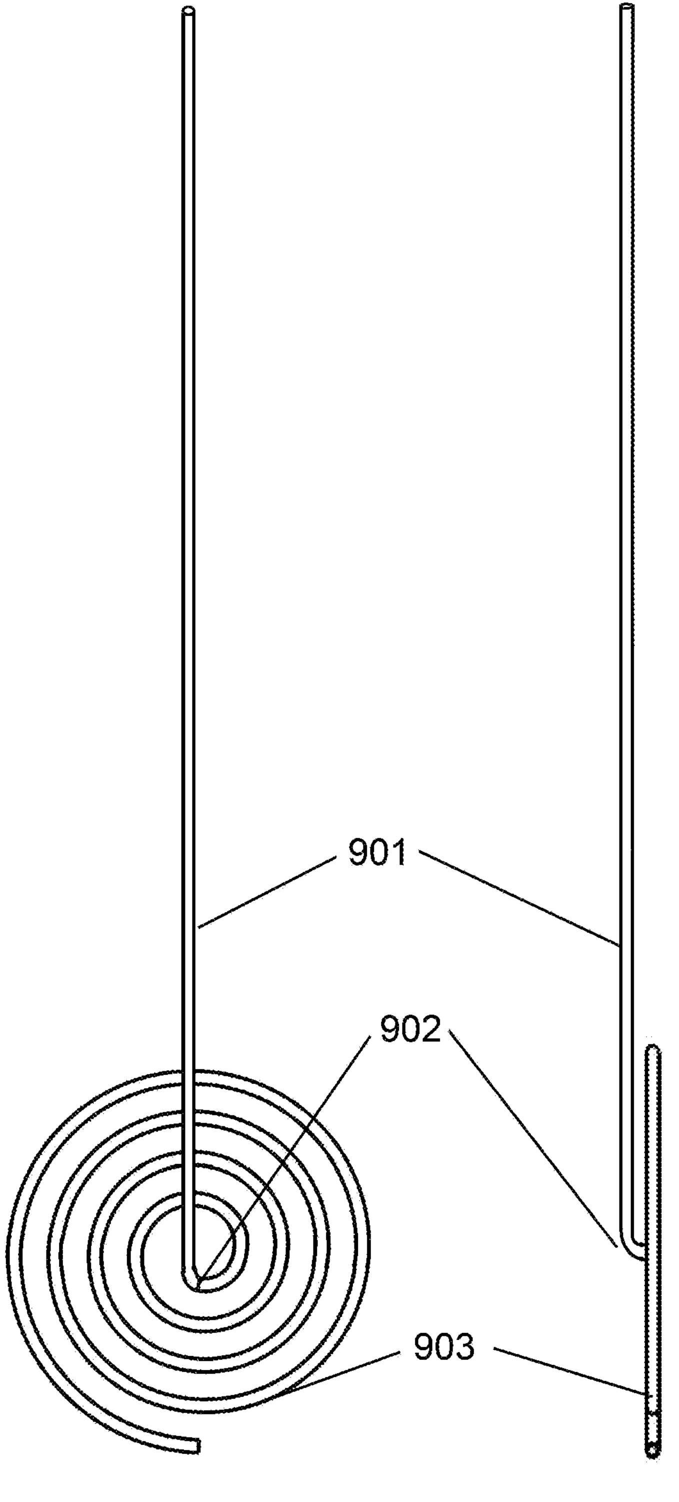
FIG. 9A is a top plan view of a plant container suspension device with shaft compressed against and/or adjacent to a radius of a support spiral.
FIG. 9B is a side view of the plant container suspension device of FIG. 9A rotated 90 degrees.

FIGS. 9A, and 9B depict an embodiment in different views. FIG. 9A is a top plan view (as if the shaft and support were resting on a surface) of a plant container suspension device comprising shaft 901, connection 902, and spiral support 903 that comprise a bendable wire wherein the spiral support which is deployed in customary use to be at a normal angle to shaft 901 is instead bent for convenient, space saving shipping, by 90 degrees so that a portion of the spiral support 903 touches shaft 901. Following purchase, the customer can re-bend/deploy the connection 902 to a desirable angle for use.

FIG. 9B is a side view of the same storage/shipping plant container suspension device positioning as seen in FIG. 9A (rotated 90 degrees to demonstrate a possible proximity of the shaft and spiral) comprising shaft 901, connection 902, and spiral support 903 approaching closely/contacting shaft 901.

Figure 10:
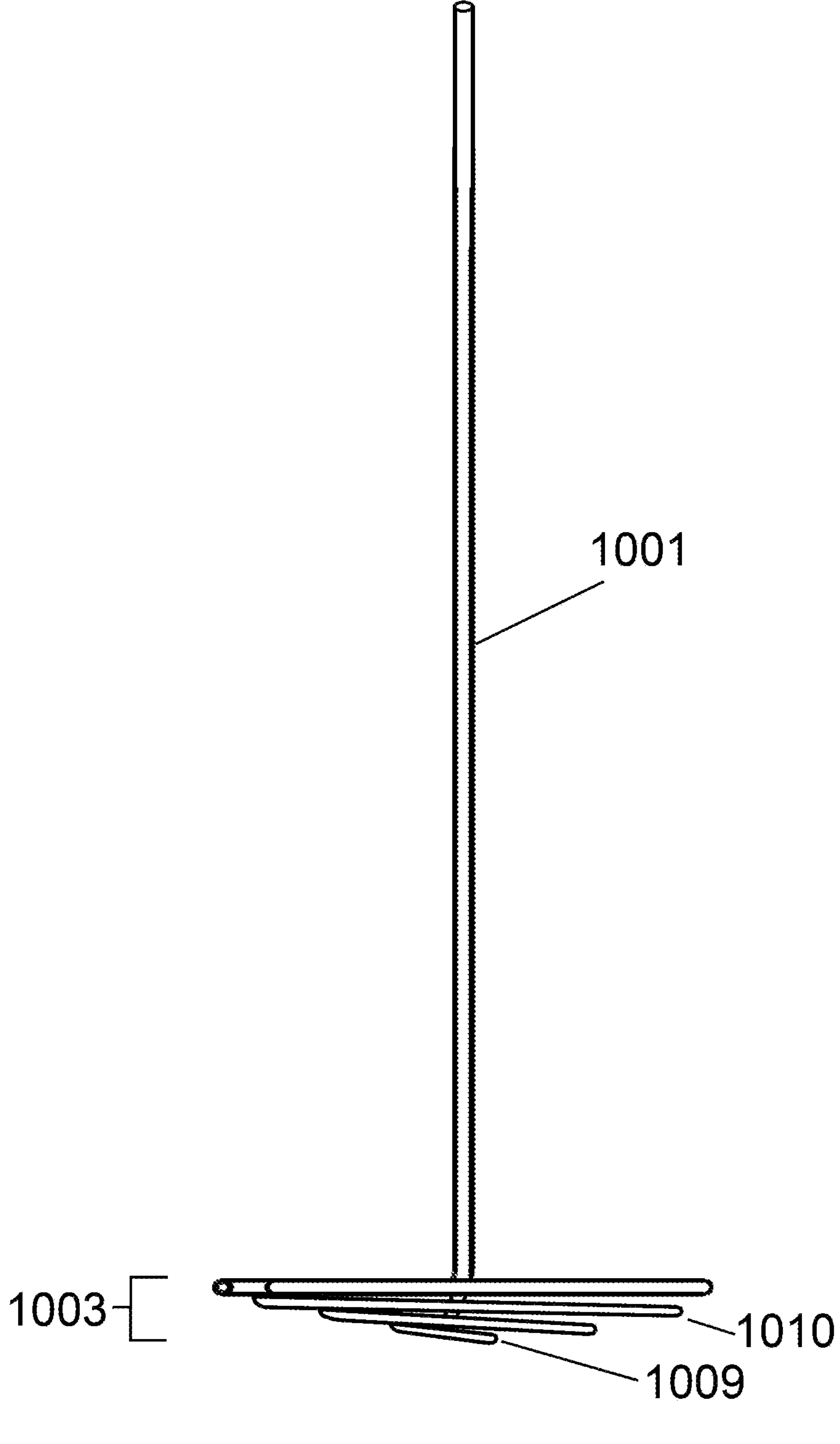
FIG. 10 is a side view of a plant container suspension device with bands of a support spiral on different planes and/or angles.

FIG. 10 is a side view of a plant container suspension device comprising shaft 1001 and different bands (1009 and 1010), of the support 1003 spiral, on different planes and/or angles. In embodiments with support elements that are malleable, the customer may bend the support to the desired shape to support plant containers such as baskets that may be more dedicate and do best when support pressures are more distributed which may also provide a cradle-like effect. Alternatively, the support element may be manufactured as such.

The invention claimed is:

1. A plant container arrangement comprising a suspension device and a plant container, the suspension device comprising a support engageable with the plant container, and a shaft extending from a central region of the support, the shaft being arranged to extend through the plant container, wherein the support comprises a spiral support having a plurality of turns.

2. A plant container arrangement according to claim 1, wherein the support extends outwards relative to the shaft, wherein the support extends around the shaft or around a region axially spaced from the end of the shaft.

3. A plant container arrangement according to claim 1, wherein the shaft has a distal end region and a proximal end region, the support being provided at the proximal end region of the shaft, and the distal end region of the shaft forming a hook for hanging the device.

4. A plant container arrangement according to claim 1, wherein the support and the shaft are integral with each other; and the suspension device comprises an elongate member, the elongate member comprising the shaft and the support; and wherein the device comprises a connection that connects the support to the shaft, the connection comprising a deformed portion of the elongate member between the shaft and the support.

5. A plant container arrangement according to claim 1, wherein the support is separable from the shaft, and wherein the device comprises a connection that connects the separate support and shaft to each other.

6. A plant container arrangement according to claim 1, wherein the suspension device is formed of a material that is malleable and/or ductile, and the support and the shaft are formed by deforming the suspension device.

7. A plant container arrangement as claimed in claim 1, wherein the plant container has an upper opening, the shaft extending into and through the plant container, and the shaft extending out of the plant container via an upper opening, wherein the support engages the plant container to support the plant container.

8. A plant container arrangement according to claim 7, wherein the plant container has a base and a mouth, and wherein the shaft is inserted into the plant container through the base, the shaft extending out of the plant container via the mouth of the plant container, and wherein the support engages the base to support the plant container.

9. A plant container system comprising a suspension device and a plant container, the suspension device comprising a support engageable with the plant container, and a shaft extending from a central region of the support, the shaft extending transverse to the support, to extend through the plant container, and a path-forming tool for forming a path through matter in the plant container.

10. A plant container system comprising a suspension device and a plant container, the suspension device comprising a support engageable with the plant container, and a shaft extending from a central region of the support, the shaft extending transverse to the support, to extend through the plant container, and the plant container system further comprising a path-forming tool for forming a path through matter in a plant container, wherein the path-forming tool comprises an elongate element having a free end region and an opposite end region, the free end region being a beveled free end region.

11. A plant container system according to claim 10, wherein the path-forming tool has a handle at said opposite end region of the elongate element, and wherein either the handle is formed by deforming the opposite end region of the elongate element into a desired shape or the handle is separable from said opposite end region of the elongate element and attachable to said opposite end region.

12. A plant container system according to claim 10, wherein said opposite end region is configured to be received by a hand tool, such as an electric drill.

13. A method of supporting a plant container, wherein the method comprises providing a plant container arrangement as claimed in claim 1, wherein the plant container has an upper opening, inserting the shaft through the container, and arranging the support in engagement with the container to support the container.

14. A method according to claim 13, wherein the plant container comprises at least one configuration selected from the group of: (a):

defining a preexisting hole therethrough; and (b) having a hole formed in the base, wherein the method comprises inserting the shaft through the hole in the base of the container.

15. A method according to claim 14, wherein the shaft may have a distal end region and a proximal end region, and the method comprises deforming the distal end region of the shaft to form a hook for hanging the suspension device.

16. A method according to claim 14, wherein the method comprises inserting the path-forming tool into the plant container via the hole and thereafter pushing the path-forming tool through matter in the plant container to form a path, and the method further comprises urging the shaft along the path when the shaft is inserted into the plant container.

17. A plant container arrangement comprising a suspension device and a plant container, the suspension device comprising a spiral support having a plurality of turns, wherein the spiral support is engageable with the plant container, and the suspension device further including a shaft extending from a central region of the support, the shaft being arranged transverse to the support to extend through the plant container.

18. A suspension system comprising a plant container, a path-forming tool for forming a path through matter in the plant container, and a suspension device comprising a support engageable with the plant container, and a shaft extending from a central region of the support, the shaft being arranged to extend through the plant container, wherein the support comprises a spiral support having a plurality of turns.

19. A plant holder suspension assembly comprising first and second of the plant container arrangements, wherein each of the first and second plant container arrangements is as claimed in claim 1, and wherein the shaft of the first suspension device is attached to the support of the second suspension device.

* * * * *